Patented Aug. 22, 1944

2,356,719

UNITED STATES PATENT OFFICE 2,356,719

CATIONIC AMINOTRIAZINE-ALDEHYDE RESIN SOLUTIONS

Henry P. Wohnsiedler, Darien, and Walter M. Thomas, Stamford, Conn., assignors to American Cyanamid Company, New York, N. Y., a corporation of Maine No Drawing. Application October 25, 1943, Serial No. 507,627

2 Claims. (Cl. 260—29)

This invention relates to compositions containing aminotriazine-aldehyde condensation products, and more particularly to colloidally dispersed ammeline-formaldehyde resins having novel characteristics.

We have discovered that ammeline-formaldehyde condensation products, when prepared in the presence of definite quantities of free acid or subsequently reacted with these same quantities of acid after their preparation by other methods, can be converted into colloidal dispersions wherein positive electrical charges are carried by the colloidal particles of the resin. In this condition the resin solutions or colloidal dispersions exhibit several unusual properties of commercial importance, and particularly the property of migration of the resin particles toward the cathode upon electrophoresis of the dispersion.

The colloidal solutions or dispersions of our invention are prepared by first reacting ammeline with aqueous formaldehyde solution, using preferably more than 3 molecular proportions of formaldehyde for each mol of ammeline, in the presence of sufficient acid to bring the pH of the reaction mixture within the range of 0.5 to about 3.5. Alternatively, ammeline-formaldehyde resins prepared by any other method, as by reacting ammeline with formaldehyde under slightly acid, neutral or alkaline conditions, may be mixed with sufficient acid to reduce the pH to the range defined above. We greatly prefer to employ strong mineral acids for these purposes, best results being obtainable with the common acids such as hydrochloric acid, phosphoric acid, nitric acid, sulfuric acid, etc. However, strong organic acids such as chloracetic acid, maleic acid and the like may be employed if desired.

After the acid resin solutions having the requisite pH of 0.5 to about 3.5 have been obtained they are allowed to age, preferably at room temperatures. We have discovered that when these solutions are allowed to stand at ordinary temperatures the ammeline-formaldehyde condensation products will undergo a progressive polymerization that is characterized by a gradual increase in the size of the resin particles until the colloidal range is reached. In this range the degree of polymerization of the resin is less than that which characterizes gels and precipitates that are undispersible by agitation with water, but is sufficient to impart definite colloidal characteristics to the resin particles. When this condition has been attained the partially polymerized ammeline-formaldehyde resin particles carry a positive electrical charge, as is shown by their migration toward the cathode upon electrophoresis of the solution. This is an extremely important property in a solution of a heat-curable thermosetting resin, for it provides a ready method of obtaining a controlled deposition of the resin in extremely thin layers on metallic surfaces and also on negatively charged materials such as cellulosic fibers, non-fibrous cellulose and the like.

The colloidal resin solutions of our invention are especially well-adapted for application to well-beaten paper stock before it is formed into a finished sheet. In the ordinary process of paper manufacture kraft, sulfite and other types of wood pulp are suspended in water at a solids content of 0.5–1%. When an aqueous dispersion of the colloidal, cationic ammeline-formaldehyde resins of the present invention is added to these paper stock suspensions, the cationic resin particles are deposited on the paper fibers in the form of a layer of curable, partially polymerized resin. Upon forming the impregnated stock into paper and drying the sheet by heating at temperatures of 250–325° F. or higher in the usual manner, paper of improved wet strength is obtained.

Laminating paper may be impregnated with the colloidal resins of the present invention and a series of sheets may then be pressed together and cured between hot platens to form a laminated sheet. Many other uses for the colloidal resin solutions will readily suggest themselves to those skilled in the art.

The colloidal ammeline-formaldehyde resin particles of the present invention contain at least 2 mols of combined formaldehyde for each mol of ammeline. When insufficient formaldehyde is used to form a condensation product containing at least 2 mols of combined formaldehyde a water-insoluble slurry is formed that cannot be converted into a colloidal solution. Ordinarily it is preferable to employ an excess of formaldehyde over that theoretically necessary to combine with the ammeline in the desired ratio of 2–4:1, since water-soluble products are more readily obtained under these conditions. Accordingly, about 4–10 or more mols of aqueous formaldehyde solution are preferably employed for each mol of ammeline in making the initial condensation.

The elapsed time necessary for ageing a clear solution of acidified ammeline-formaldehyde condensation products to the colloidal condition in which they carry a positive electrical charge is dependent upon the ageing conditions. In general, the ageing process is shortened by increasing either the temperature or the concentration of the acid resin solution, or both. Thus, for example, solutions having a solids content of about 44% which will form the colloid in 24 hours will require from 36 to 42 hours for colloid formation if diluted to 20% solids. However, the colloid is formed in about 24 hours in the 20% solution if the ageing is conducted at 40–50° C. instead of at 20–25° C. The ageing period may also be shortened by decreasing the amount of acid present in the solution.

The formation of a colloidal solution is shown in the first instance by the presence of a definite Tyndall effect under the influence of a beam of light or in the dark field microscope. Although the colloidal solution is infinitely dilutable with water it is extremely acid-sensitive, and this constitutes a very delicate test to determine whether any colloidal acid-type resin is present. When a strong acid such as 6N hydrochloric acid is added to a clear acidified resin solution that has not been aged no immediate change occurs, but when the acid resin solution has been aged for a time sufficient to bring even a small part of the resin particles within the colloidal range these particles are precipitated by the addition of the acid. This reaction with strong acids can be used to estimate the degree of polymerization of the resin solution since the amount of acid necessary for precipitation becomes less with increasing age of the solution.

Although the physical appearance and the addition of strong mineral acid are useful methods of identifying the colloidal solutions of partially polymerized ammeline-formaldehyde resins of the present invention, the most comprehensive test consists in the passage of a direct current of electricity through the solution. When the solutions of the present invention are subjected to electrophoresis in this manner the existence of a definite positive electrical charge is shown by the migration of the colloid resin toward the cathode. The cataphoresis is preferably carried out by passing a direct current of 90–120 volts through platinum electrodes immersed in the colloidal solution.

The invention will be illustrated in greater detail by the following specific examples. It should be understood, however, that these examples are given primarily for purposes of illustration, and that the invention in its broader aspects is not limited thereto.

Example 1

A mixture of 1 mol of ammeline, 6 mols of 37% aqueous formaldehyde solution and 3 mols of $H_3PO_4$ was heated for 5 minutes at 90° C. with the addition of sufficient water to bring the final solution to 40% solids. The resulting ammeline-formaldehyde resin contained approximately 3.2 mols of combined formaldehyde and the pH of the solution (glass electrode) was 0.9. Upon ageing for 24 hours at room temperature the solution developed a bluish colloidal haze, which grew stronger and deeper until a dispersible gel was formed after 7 days standing.

Example 2

A mixture of 1 mol of ammeline, 6 mols of 37% formaldehyde and 3 mols $H_3PO_4$ was refluxed for 1 hour, diluted to 10% solids, and aged for 8 days. A portion of the resulting colloidal solution was then filled into a U-tube with an electrode inserted into each arm, and the blue solution was covered with a layer of clear distilled water. A direct current of 120 volts potential was applied to the electrodes, each of which had an area of approximately 1 square inch.

Upon continued passage of the current through the solution the resin exhibited a definite positive charge and after several hours there was a definite migration to the cathode. In a sample taken from the anode compartment there was 0.18 mg. of nitrogen while a sample of equal size taken from the cathode compartment contained 6.26 mg. of nitrogen.

Example 3

A second ammeline resin was prepared by refluxing 1 mol of ammeline, 10 mols of aqueous formaldehyde solution and 0.8 mols of sulfuric acid at 50% solids for 2.5 hours under atmospheric pressure. The resulting resin solution had a pH of 0.9 and remained clear for one week. After ageing for one day it was tested by electrophoresis and found to be positively charged.

Example 4

A mixture of 1 gram mol of ammeline, 1 gram mol of hydrochloric acid and 6 gram mols of 37% aqueous formaldehyde solution was heated at reflux temperatures for 1 hour at a solids content of 44%. The resulting product was a clear, water-soluble syrup having a pH of 0.9. After ageing at room temperatures for 24 hours a colloidal haze developed in the solution, and upon testing by electrophoresis the resin was found to be positively charged.

This application is a continuation-in-part of our copending application Serial No. 453,120 filed July 31, 1942, now Patent No. 2,345,543.

What we claim is:

1. A colloidal aqueous solution of a partially polymerized positively charged ammeline-formaldehyde condensation product having a pH value within the range of about 0.5 to about 3.5, said condensation product containing about 2–4 mols of combined formaldehyde for each mol of ammeline and having a degree of polymerization less than that which characterizes gels and precipitates which are undispersible by agitation with water but sufficient to bring the particles thereof within the colloidal range, said condensation product having a definite positive electrical charge as shown by its migration toward the cathode upon electrophoresis of the solution.

2. A colloidal aqueous solution of a partially polymerized, positively charged ammeline-formaldehyde condensation product, said solution containing sufficient strong mineral acid to maintain a pH value within the range of 0.5–3.5, said condensation product containing about 2–4 mols of combined formaldehyde for each mol of ammeline and having a degree of polymerization less than that which characterizes gels and precipitates which are undispersible by agitation with water but sufficient to bring the particles thereof within the colloidal range, said condensation product having a definite positive electrical charge as shown by its migration toward the cathode upon electrophoresis of the solution.

HENRY P. WOHNSIEDLER.
WALTER M. THOMAS.